July 11, 1961 A. CANDELISE 2,991,766
AIR INJECTION SYSTEM FOR AN INTERNAL COMBUSTION ENGINE
Filed March 4, 1960

INVENTOR.
Alfred Candelise
BY
D. D. McGraw
ATTORNEY

United States Patent Office 2,991,766
Patented July 11, 1961

2,991,766
AIR INJECTION SYSTEM FOR AN INTERNAL COMBUSTION ENGINE
Alfred Candelise, Flint, Mich., assignor to General Motors Corporation, Detroit, Mich., a corporation of Delaware
Filed Mar. 4, 1960, Ser. No. 12,846
5 Claims. (Cl. 123—26)

The invention relates to a system for injecting air into the combustion chambers of an internal combustion engine during a portion of the expansion strokes. A generally similar air injection system is disclosed in my copending application S.N. 12,857, filed March 4, 1960. The system which is the subject of the invention herein disclosed and claimed may utilize a generally similar air distribution and timing valve mechanism, however, exact timing of the introduction of air into the cylinder is accomplished by using the engine piston as the exact timing device. The air from the air distribution and timing valve is supplied to a ready chamber adjacent the engine piston in a roughly timed relation so that it is present only after the piston has passed the ready chamber discharge port during the compression stroke. The supply of air to the ready chamber is cut off prior to the intake stroke of the piston so that no air is introduced into the engine chamber during the intake stroke.

The advantages of introducing compressed air into the combustion chamber of an engine during and after normal combustion has been completed are numerous. They include the burning of previously unburned hydrocarbons which would normally be exhausted as a part of the engine exhaust gases, the substantial elimination of carbon monoxide, and improvements in detonation characteristics.

Figure 1:
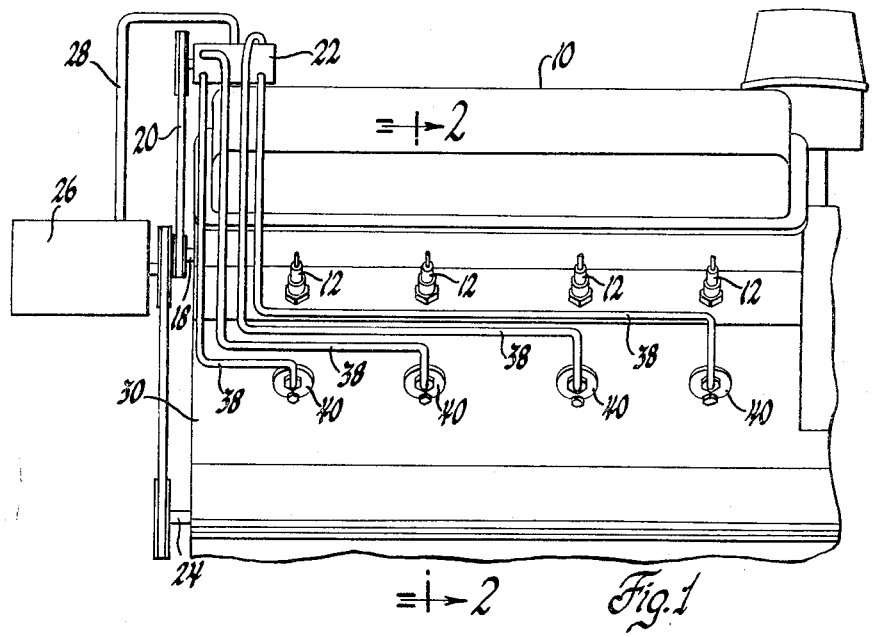
FIGURE 1 is a schematic view of an air injection system installed on an internal combustion engine and embodying the invention.
Figure 2:
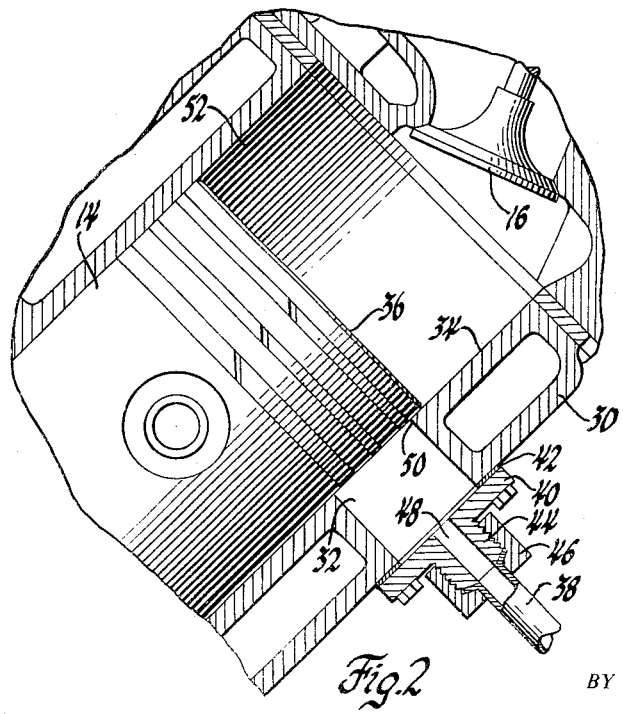
FIGURE 2 is a cross section view with parts broken away of one of the cylinders of the engine of FIGURE 1 and showing details of the system for introducing air into the engine cylinder.

The engine 10 illustrated in FIGURE 1 is of the V-8 type although it may be of any other type if desired. Each engine cylinder is provided with a spark plug 12, a piston 14 and suitable intake and exhaust valves, intake valve 16 being illustrated in FIGURE 2. The engine camshaft 18 may be provided with a suitable drive belt or chain 20 which will drive the air distribution and timing valve 22 in timed relation to the engine crankshaft 24. Valve 22 is therefore operated in time with the strokes of the pistons 14 in the cylinders so that air may be supplied to the cylinders during the expansion strokes. Crankshaft 24 may drive a suitable air compressor 26 which is connected to valve 22 by conduit 28. The engine block 30 has a ready chamber 32 formed therethrough so that its discharge port connects with engine cylinder 34 at a point somewhat below the top 36 of piston 14 when that piston is in the top dead center position. The height of the discharge port of chamber 32 along the cylinder walls determines the exact timed amount of air introduced during the expansion stroke. This may be any desired amount at which air introduction is begun, may be at any position after top dead center which is found desirable. Suitable conditions of timing and compressed air pressures and quantities are discussed in the copending application referred to above.

Each ready chamber 32 is provided with a conduit 38 connecting with valve 22 to provide compressed air to the chamber. A chamber cover 40 is secured over the chamber and forms a seal with the outer side of the engine block 30. A gasket 42 may be provided under cover 40 to adequately seal the chamber. Cover 40 has a fitting 44 formed thereon which will receive the discharge end of conduit 38 so that the conduit is securely fastened by suitable means such as the nut 46 and is in alignment with the passage 48 extending through the cover and into the chamber 32.

Although a timing and distribution valve having exact accuracy may be utilized in a manner similar to the valve in my copending application referred to above, it is preferable to use a valve which provides an overlapping timing condition so that compressed air under full pressure is supplied to each ready chamber 32 before piston top 36 reaches the upper side 50 of the ready chamber during its downward movement which constitutes the expansion stroke. The air is then exactly timed by movement of the piston 14 and no time lag occurs due to the length of the conduits 38 which supply air from the valve 22 to the various ready chambers. It has been found that it is very important to provide the compressed air at full pressure throughout the injection period in order to obtain full benefits from the use of the system. Air injection into each cylinder will continue until the valve 22, in its cycle of operation, cuts off the supply of compressed air to the ready chamber of each cylinder. If desired, compressed air may be injected throughout the latter portion of the expansion stroke and the beginning of the exhaust stroke until the piston top 36 passes the upper side 50 of the chamber and closes the chamber discharge port. The air will then aid in scavenging the cylinder and will also insure an adequate supply of oxygen to complete the combustion of any previously unburned hydrocarbons which are being exhausted from the engine.

By locating the upper side 50 of the ready chamber 32 below the top dead center position of piston 14 a distance corresponding to approximately 90° of crank angle after top dead center, the air will be injected into the gases in the combustion chamber 52 after the normal combustion has been completed or approximately at the completion of that step. The gases will still have a sufficiently high temperature to either continue the burning of the hydrocarbons in the combustion chamber or to reignite them when the supply of air is replenished in this manner. Additional power will be obtained and greater engine efficiency will result. By injecting the air through a cylinder side wall, and therefore causing the air to move transversely through the combustion chamber, a turbulence is set up which causes better mixing of the incoming compressed air with the gases in the cylinder. The compressed air tends to move in directions transverse to the general movement of the expanding gases as the piston moves downwardly on the power stroke to accomplish this turbulence. The air passes over the top of the piston, tends to keep carbon deposits on the piston head to a minimum, and also cools the piston.

What is claimed is:
1. A compressed air injection system for injecting compressed air into the combustion chamber of an internal combustion engine during the expansion stroke of the engine, said system comprising a source of compressed air, first air timing means receiving compressed air from said source and delivering compressed air to the engine in a first timed relation over a timing period longer than that period during which the air is to be injected into the engine combustion chamber, an engine cylinder having a cylinder head and cylinder side wall and a piston reciprocating in said cylinder and a passage formed through said cylinder side wall and providing a compressed air ready chamber, means connecting said first timing means with said ready chamber to provide air to said chamber in said first timed relation, said piston and said ready chamber cooperating to provide a second timing means for pre- cisely timing the injection of compressed air into said combustion chamber.

2. In combination with an internal combustion engine having an engine block and cylinder head and a plurality of cylinders formed in said block and pistons mounted for reciprocating in said cylinders to define combustion chambers in said cylinders, a system for injecting compressed air into said combustion chambers during the expansion strokes thereof, said system comprising a compressed air source, an air timing and distribution valve for distributing compressed air from said source to each of said combustion chambers in timed relation with the movement of said pistons, a plurality of conduits each connecting said valve with one of said combustion chambers, each of said cylinder walls having a transversely extending port formed therethrough and providing an air chamber receiving air from one of said conduits, each of said ports having an upper side positioned in said cylinder walls below the top dead center position of said pistons, said pistons passing and opening said ports on the piston downward strokes and said valve providing air to each of said ports only during the piston expansion strokes, said pistons and said ports thereby providing precise timing means for introducing compressed air into said combustion chambers.

3. In combination with an internal combustion engine having engine cylinders and pistons received therein and cylinder head means cooperating to provide a plurality of combustion chambers, means for injecting compressed air into said combustion chambers in timed relation with the engine stroke-cycle, said means including first air distribution and timing means delivering compressed air throughout a first time range in approximate timed relation with a portion of the engine stroke-cycle, and a second timing means receiving the compressed air delivered from said first timing means and introducing the compressed air throughout a second time range no greater than and included within said first time range into said combustion chambers in exact timed relation with a portion of the engine stroke-cycle.

4. The combination of claim 3, said second timing means including a port formed in a cylinder wall of each of said engine cylinders and said pistons reciprocating in said engine cylinders to open and close said ports.

5. In combination with a four stroke-cycle internal combustion engine having a plurality of cylinders and pistons received for reciprocation in said cylinders and cooperating with said cylinders to define engine combustion chambers, a compressed air system for injecting compressed air into said combustion chambers, said system comprising a source of compressed air, first air timing and distribution means receiving compressed air from said source and having independent connections to each of said cylinders for delivering compressed air thereto, in timed relation to said engine, each of said cylinders having a port extending through a side wall thereof and providing an air chamber for receiving air from said first timing and distribution means, said pistons opening said ports on the downward piston strokes and closing said ports on the upward piston strokes and cooperating with said ports to provide second air timing means for exactly timing the injection of compressed air into said combustion chambers in relation to said engine, said first timing and distribution means distributing air to each of said ports only during the period after each of the piston compression strokes and before each of the piston intake strokes.

References Cited in the file of this patent
UNITED STATES PATENTS

| | | |
|---|---|---|
| 1,106,194 | Dunham | Aug. 4, 1914 |
| 1,799,761 | Pew | Apr. 7, 1931 |
| 1,825,959 | Kondo | Oct. 6, 1931 |